United States Patent
Zheng et al.

(10) Patent No.: US 10,922,256 B2
(45) Date of Patent: Feb. 16, 2021

(54) DISPLAY APPARATUS AND CONTROL METHOD FOR HIGH DISPLAY BANDWIDTH THEREOF

(71) Applicant: Wistron Corp., New Taipei (TW)

(72) Inventors: Li Fan Zheng, New Taipei (TW); Yong Qiang Li, New Taipei (TW); Yong Bo Li, New Taipei (TW); Jun Xin Qiu, New Taipei (TW); Wen Long Yang, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/460,938

(22) Filed: Jul. 2, 2019

(65) Prior Publication Data

US 2020/0233822 A1 Jul. 23, 2020

(30) Foreign Application Priority Data

Jan. 23, 2019 (CN) .......................... 2019 1 0064712

(51) Int. Cl.
*G06F 13/38* (2006.01)
*G06F 3/14* (2006.01)
*G06F 13/42* (2006.01)
*G06F 3/147* (2006.01)

(52) U.S. Cl.
CPC .......... *G06F 13/385* (2013.01); *G06F 3/1407* (2013.01); *G06F 3/147* (2013.01); *G06F 13/4282* (2013.01); *G06F 2213/0024* (2013.01); *G06F 2213/0042* (2013.01); *G06F 2213/3812* (2013.01)

(58) Field of Classification Search
CPC ...... G06F 3/1407; G06F 3/147; G06F 13/385; G06F 13/4282; G06F 2213/0024; G06F 2213/0042; G06F 2213/3812
See application file for complete search history.

(56) References Cited

U.S. PATENT DOCUMENTS

| | | | |
|---|---|---|---|
| 10,002,105 B2* | 6/2018 | Chen | G06F 13/4022 |
| 10,169,286 B2* | 1/2019 | Hundal | G06F 13/4282 |
| 2017/0017595 A1* | 1/2017 | Schnell | G06F 13/4022 |
| 2018/0239732 A1* | 8/2018 | Yang | G09G 5/006 |
| 2019/0075338 A1* | 3/2019 | Liao | H04N 21/2389 |

FOREIGN PATENT DOCUMENTS

| | | |
|---|---|---|
| CN | 107408082 A | 11/2017 |
| CN | 207283696 U | 4/2018 |
| TW | I590063 B | 7/2017 |

* cited by examiner

*Primary Examiner* — Eric T Oberly

(57) ABSTRACT

A display apparatus is provided. The display apparatus includes a display panel and a display controller. The display controller is electrically connected to a USB Type-C interface of a host via a USB Type-C interface of the display apparatus. In response to the USB Type-C interface of the display apparatus being in a USB Type-C default pin-assignment mode, the display controller receives an image signal from the host via two USB SuperSpeed channels of the USB Type-C interface of display apparatus. In response to a display mode of the display apparatus satisfying a specific condition, the display controller controls the USB Type-C interface of the display apparatus to enter a USB Type-C first pin assignment mode, so that the host utilizes the four USB SuperSpeed channels of the USB Type-C interface of the display apparatus to transmit the image signal to the display controller.

20 Claims, 8 Drawing Sheets

US 10,922,256 B2

DISPLAY APPARATUS AND CONTROL METHOD FOR HIGH DISPLAY BANDWIDTH THEREOF

CROSS REFERENCE TO RELATED APPLICATIONS

This application claims priority of China Patent Application No. 201910064712.2, filed on Jan. 23, 2019, the entirety of which is incorporated by reference herein.

BACKGROUND OF THE DISCLOSURE

Field of the Disclosure

The disclosure relates to display apparatuses, and, in particular, to a display apparatus, and a control method for high display bandwidth thereof.

Description of the Related Art

Advances in technology have allowed more and more display apparatuses on the market to be equipped with a Universal Serial Bus (USB) Type-C interface for use as a signal input interface. When a conventional display apparatus equipped with a USB Type-C interface is connected to the USB Type-C interface of a personal computer, the personal computer merely uses two USB SuperSpeed channels to transmit an image signal to the conventional display apparatus. However, the display apparatus may have other display requirements, such as high image resolution (e.g., 4K or 8K), high color depth (e.g., 10 bits or above), or the use of DisplayPort's daisy chain function to connect multiple display apparatuses.

However, the conventional display apparatus equipped with the USB Type-C interface can only be fixed in an operation mode in which two USB SuperSpeed channels are used to receive the image signal from the personal computer, and cannot be dynamically adjusted to the requirements of the display apparatus, and thus the display function of the display apparatus cannot be fully utilized.

BRIEF SUMMARY OF THE DISCLOSURE

A detailed description is given in the following embodiments with reference to the accompanying drawings.

In an exemplary embodiment, a display apparatus is provided. The display apparatus includes a display panel and a display controller. The display controller is electrically connected to a USB Type-C interface of a host via a USB Type-C interface of the display apparatus. In response to the USB Type-C interface of the display apparatus being in a USB Type-C default pin-assignment mode, the display controller receives an image signal from the host via two USB SuperSpeed channels of the USB Type-C interface of display apparatus, and displays the image signal on the display panel. In response to a display mode of the display apparatus satisfying a specific condition, the display controller controls the USB Type-C interface of the display apparatus to enter a USB Type-C first pin assignment mode, so that the host utilizes the four USB SuperSpeed channels of the USB Type-C interface of the display apparatus to transmit the image signal to the display controller.

In another exemplary embodiment, a control method of high display bandwidth for use in a display apparatus is provided. The display apparatus includes a display panel and a display controller, and the display apparatus is electrically connected to a USB Type-C interface of a host via a USB Type-C interface of the display apparatus. The control method includes the steps of: in response to the USB Type-C interface of the display apparatus being in a USB Type-C default pin-assignment mode, receiving an image signal from the host via two of four USB SuperSpeed channels of the USB Type-C interface of the display apparatus and displaying the image signal on the display panel; and in response to a display mode of the display apparatus satisfying a specific condition, controlling the USB Type-C interface to enter a USB Type-C first pin-assignment mode, so that the host utilizes the four USB SuperSpeed channels of the USB Type-C interface of the display apparatus to transmit the image signal to the display controller.

In yet another exemplary embodiment, a display apparatus is provided. The display apparatus includes: a display panel and a display controller. The display controller is electrically connected to a universal serial bus (USB) Type-C interface of a host via a USB Type-C interface of the display apparatus. In response to a specific condition being satisfied, the display controller deactivates a multi-function mode and a DisplayPort alternate mode of the display apparatus, so that the display apparatus receives a data signal from the host via four USB SuperSpeed channels of the USB Type-C interface of the display apparatus.

BRIEF DESCRIPTION OF THE DRAWINGS

The embodiments of the disclosure can be more fully understood by reading the subsequent detailed description and examples with references made to the accompanying drawings, wherein.

DETAILED DESCRIPTION OF THE DISCLOSURE

The following description is made for the purpose of illustrating the general principles of the disclosure and should not be taken in a limiting sense. The scope of the disclosure is best determined by reference to the appended claims.

Figure 1:
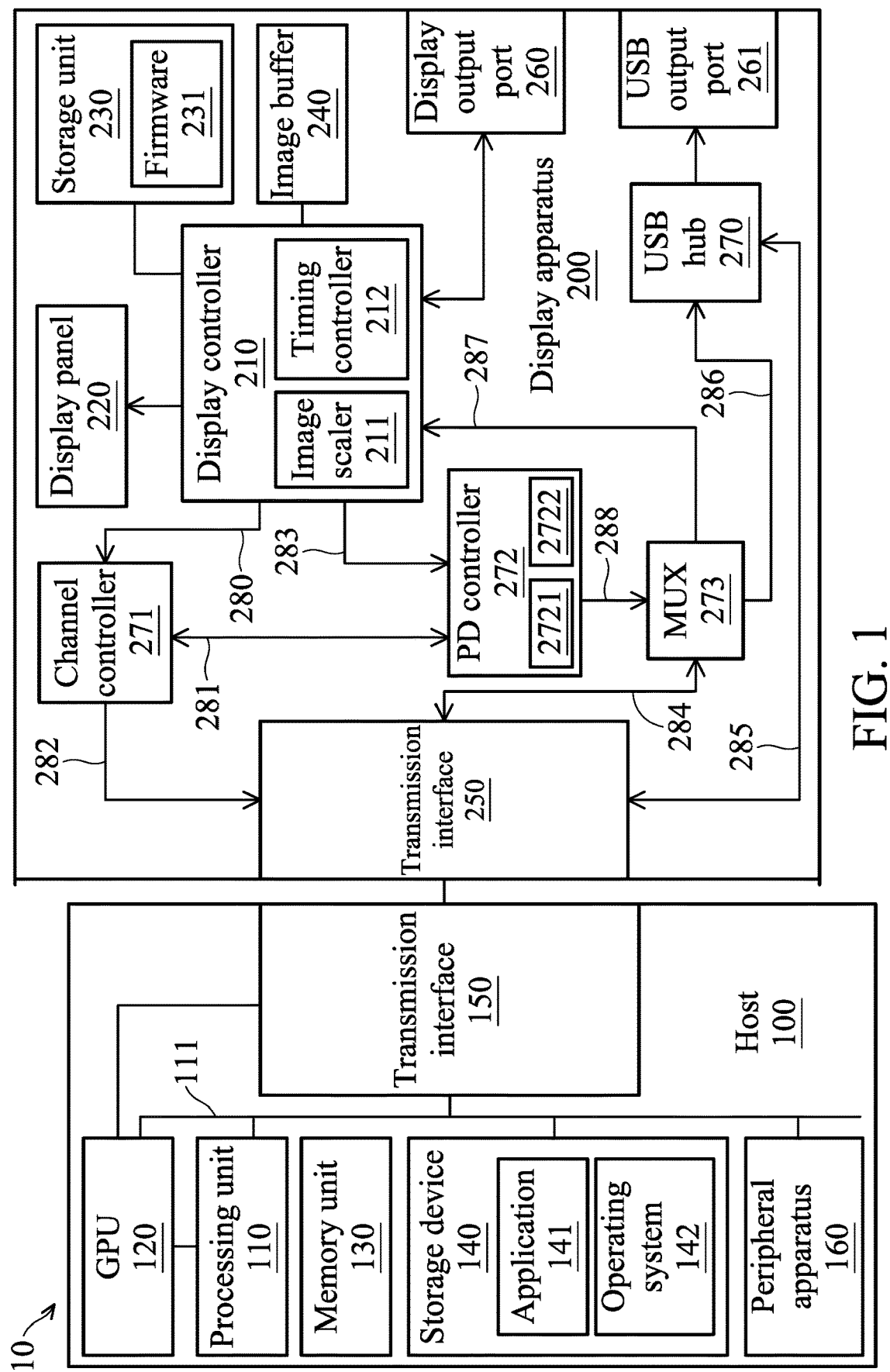
FIG. 1 is a block diagram of a computer system in accordance with an embodiment of the disclosure.

FIG. 1 is a block diagram of a computer system in accordance with an embodiment of the disclosure. The computer system 10, for example, may be a personal computer or server equipped with a display apparatus. As illustrated in FIG. 1, the computer system 10 includes a host 100 and a display apparatus 200, wherein the host 100 is electrically connected to the display apparatus 200. For example, the host 100 may include a processing unit 110, a graphics processing unit (GPU) 120, a memory unit 130, a storage device 140, one or more transmission interfaces 150, and one or more peripheral apparatuses 160. The processing unit 110, graphics processing unit 120, memory unit 130, storage device 140, transmission interfaces 150, and peripheral apparatuses 160 may couple to each other via the system bus 111. The processing unit 110, for example, may be a central processing unit (CPU), a general-purpose processor, etc., but the disclosure is not limited thereto. The graphics processing unit 120, for example, may be a graphics processing unit on a video adapter or integrated into the processing unit 110.

The memory unit 130 may be a random access memory such as a static random access memory (SRAM) or a dynamic random access memory (DRAM), but the disclosure is not limited thereto. The storage device 140 may be a hard-disk drive, a solid-state disk (SSD), a flash memory, or a read-only memory (ROM), but the disclosure is not limited thereto.

The transmission interface 150 may include wired transmission interfaces. The wired transmission interfaces may include: high definition multimedia interface (HDMI), DisplayPort (DP) interface, embedded DisplayPort (eDP) interface, universal serial bus (USB) interface, USB Type-C interface, Thunderbolt interface, digital video interface (DVI), video graphics array (VGA) interface, general purpose input/output (GPIO) interface, universal asynchronous receiver/transmitter (UART) interface, serial peripheral interface (SPI), inter-integrated circuit (I2C) interface, or a combination thereof. The peripheral apparatus 160, for example, may include input apparatuses such as a keyboard, a mouse, a touch pad, etc., but the disclosure is not limited thereto.

For example, the storage device 140 may store one or more applications 141 and an operating system 142 (e.g., Windows, Linux, MacOS, etc.). The processing unit 110 may load the operating system 142 and one of the applications 141 to the memory unit 130 for execution. The graphics processing unit 120, for example, may perform graphics processing of the application executed by the processing unit 110 to generate an image signal including one or more images, and transmit the image signal to the display apparatus 200 via one of the transmission interfaces 150 (e.g., USB Type-C interface or abbreviated as the "USB-C interface").

The display apparatus 200, for example, may be a flat panel display, a television, a projector, or a computer monitor, but the disclosure is not limited thereto. The display apparatus 200 includes a display controller 210, a display panel 220, a storage unit 230, an image buffer 240, one or more transmission interface 250, a display output port 260, a USB hub 270, a channel controller 271, a Power Delivery (PD) controller 272, and a multiplexer 273.

The display controller 210, for example, may be implemented by an application-specific integrated circuit (ASIC), a system-on-chip (SoC), a processor, or a microcontroller, but the disclosure is not limited thereto.

The display module 220, for example, may be a liquid-crystal display panel, a light-emitting diode (LED) display panel, an organic light-emitting diode (OLED) display panel, an E-Ink display module, an electroluminescent display module, a plasma display module, a projection display module, or a quantum dot display module, but the disclosure is not limited thereto.

The storage unit 230, for example, may be a non-volatile memory such as a read-only memory (ROM), an erasable programmable read-only memory (EPROM), an electrically erasable programmable read-only memory (EEPROM), etc., but the disclosure is not limited thereto. The storage unit 230 is configured to store firmware 231 associated with the display apparatus 200. The storage unit 230 may be disposed outside the display controller 210, or alternatively integrated into the display controller 210.

The firmware 231, for example, may include extended display identification data (EDID) and display settings, and an on-screen-display (OSD) interface of the display apparatus 200. The EDID, for example, may include information such as the manufacturer, product name, resolution, frames per second (FPS) of the display apparatus 200. The display settings of the display apparatus 200 may include the brightness, contrast, sharpness, color temperature of the display apparatus 200. In an embodiment, the display controller 210 may read the firmware 231 stored in the storage unit 230 via a bus (e.g., an I2C bus), and configure the corresponding display parameters. In addition, the display controller 210 may transmit the EDID of the display apparatus 200 to the host 100 via one of the transmission interfaces 250 (e.g., USB Type-C interface), so that the processing unit 110 and the graphics processing unit 120 in the host 100 may configure the resolution and corresponding synchronization signals of the output image signal based on the EDID.

The image buffer 240, for example, may be a volatile memory (e.g., a DRAM) or a non-volatile memory (e.g., a flash memory), that is configured to store output images to be displayed on the display panel 220.

The transmission interface 250 may include wired transmission interfaces and/or wireless transmission interfaces. The wired transmission interfaces may include: high definition multimedia interface (HDMI), DisplayPort (DP) interface, embedded DisplayPort (eDP) interface, universal serial bus (USB) interface, USB Type-C interface, Thunderbolt interface, digital video interface (DVI), video graphics array (VGA) interface, or a combination thereof. The display output port 260, for example, may be a display output port compatible with the DisplayPort standard which supports the function of "Multi-stream Transport" (MST) in the DisplayPort version 1.2 and above, and can be connected to a plurality of display apparatuses 200 in series as a "daisy chain" via the DisplayPort interface of the transmission interfaces 250 and the display output port 260 of the display apparatus 200.

The USB hub 270, for example, may receive the USB data signal from the host 100 via one of the transmission interface 250 (e.g., USB Type-C interface). The USB data signal may include a USB SuperSpeed data signal and a USB HighSpeed data signal. For example, the USB SuperSpeed data signal may be a data signal supporting a data rate utilized by the USB 3.1 Gen1 (a.k.a. USB 3.2 Gen 1) or above, and can be transmitted via two USB SuperSpeed channels of the USB Type-C interface. The USB SuperSpeed channel 1, for example, may include pins A2-A3 (TX1+ and TX1−), B10-B11 (RX1− and RX1+) of the USB Type-C interface, and the USB SuperSpeed channel 2, may include pins A10-A11 (RX2− and RX2+) and B2-B3 (TX2+ and TX2−) of the USB-Type C interface. The USB HighSpeed data signal, for example, may be a data signal supporting a data rate utilized by the USB 2.0 standard, and can be transmitted via the "USB 2.0 compatible" differential signal pairs of pins A6-A7 and B6-B7 (i.e., D+ and D−) in the USB Type-C interface. The details of the control operations of the USB hub 270 will be described later.

In an embodiment, the display controller 210 may include an image scalar 211 and a timing controller 212. The display controller 210 may receive the image signal from the host 100 and/or another signal from other hosts via one of the transmission interfaces 250, and the image scalar 211 may perform an image-scaling process and/or image-overlaying process on the received image signal to fit the resolution of the display module 220, and store the images (e.g., output images) generated by the image-scaling process to the image buffer 240. The timing controller 212 may control the display module 220 to read the output images from the image buffer 240 for displaying the output images.

The channel controller 271 is connected to pins CC1 and CC2 of the USB Type-C interface of the transmission interfaces 250, and is capable of determining whether the pin signals CC1 and CC2 of the USB Type-C interface are enabled according to the channel-enable signal 280 from the display controller 210.

The PD controller 272 may modify the values stored in registers 2721 and 2722 according to the PD-control signal 283 from the display controller 210. For example, the register 2721 (e.g., a first register) is configured to record a status of the multi-function mode of the display apparatus 200. The register 2722 (e.g., a second register) is configured to record a pin-assignment mode of the display apparatus 200. Specifically, the PD controller 272 may activate or deactivate the multi-function mode of the display apparatus and the pin-assignment D mode (i.e., the default pin-assignment mode) of the USB Type-C interface.

In addition, the PD controller 272 may also issue a switch-control signal 288 to the multiplexer 273, so that the multiplexer 273 may transmit the image signal received by four USB SuperSpeed channels or two of the USB SuperSpeed channels of the USB Type-C interface of the transmission interfaces 250 of the display apparatus 200 to the display controller 210 according to the switch-control signal 288 from the PD controller 272, where the details will be described later.

Figure 2A:
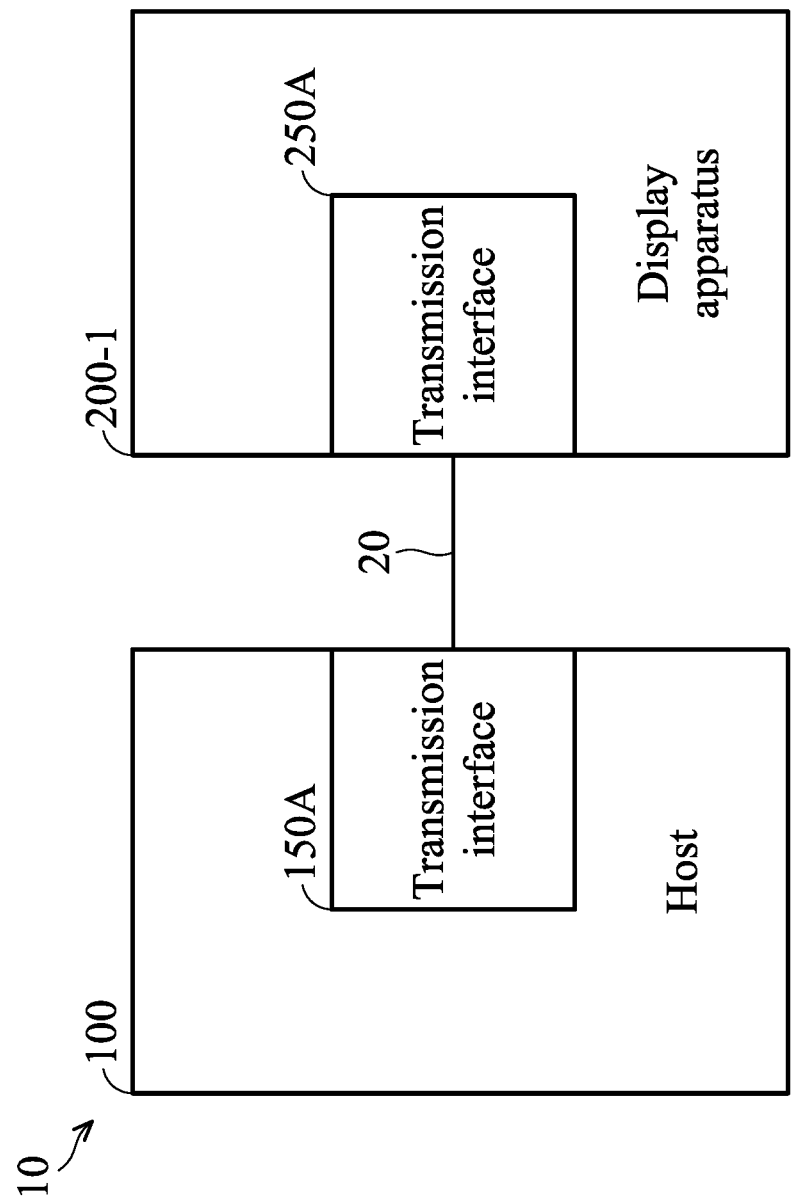
FIG. 2A is a diagram of the connection between the host and the display apparatus in accordance with an embodiment of the disclosure.

FIG. 2A is a diagram of the connection between the host and the display apparatus in accordance with an embodiment of the disclosure. For purposes of description, in the following embodiments, each of the display apparatuses 200-1~200-3 may be identical to the display apparatus 200, and the reference numerals are added to distinguish different display apparatuses.

As depicted in FIG. 2A, the host 100 is connected to the display apparatus 200-1 via a first image channel 20 between the transmission interfaces 150A and 250A. The image signal generated by the GPU 120 of the host 100 is transmitted to the display controller 210 of the display apparatus 200 via the transmission interface 150A (e.g., USB Type-C interface) of the host 100 and the transmission interface 250A (e.g., USB Type-C interface) of the display apparatus 200-1. It should be noted that the USB Type-C protocol can support audio and video transmission (e.g. supporting the DisplayPort standard), it also provides high-speed data transmission, which can combine image transmission channels and data transmission channels.

In addition, the processing unit 110 and the GPU 120 of the host 100 may confirm the multi-function mode and pin-assignment mode of the USB Type-C interface in the "DisplayPort Alternate Mode" via the PD controller 272 of the display apparatus 200-1, and then obtain the EDID from the display apparatus 200-1 after confirming the pin-assignment mode. Accordingly, the processing unit 110 may set the transmission interface 150A to the pin-assignment D mode of the USB Type-C protocol in the "DisplayPort Alternate Mode", and the transmission interface 150A may support the SuperSpeed data transmission supported by the DisplayPort and USB 3.2 Gen1 standards. Specifically, the processing unit 110 may use two of the four USB SuperSpeed channels for display transmission (i.e., transmitting the image signal), and use another two of the four USB SuperSpeed channels for data transmission.

However, the bandwidth of a single USB SuperSpeed channel depends on the specification of the DisplayPort standard supported by the transmission interface 250A (e.g., USB Type-C interface) of the display apparatus 200-1 and the transmission interface 150A (e.g., USB Type-C interface) of the host 100. If both transmission interfaces 150A and 250A support the USB 3.2 Gen1 standard, the bandwidth of a single USB SuperSpeed channel is 5 Gbps. If both transmission interfaces 150A and 250A support the DisplayPort revision 1.3 and above (i.e., the DisplayPort High-Bit Rate (HBR) 3 configuration, the bandwidth of a single USB SuperSpeed channel is 8.1 Gbps. If only one of the transmission interfaces 150A and 250A supports the DisplayPort revision 1.2 standard (i.e., the HBR 2 configuration), the bandwidth of a single USB SuperSpeed channel is 5.4 Gbps.

Accordingly, when the processing unit 110 sets the transmission interface 150A to the default pin-assignment mode (e.g., USB Type-C pin-assignment D mode in the DisplayPort Alternate mode) in the multi-function mode, two of the four USB SuperSpeed channels are used for display transmission (i.e., transmitting the image signal). If both transmission interfaces 150A and 250A support the DisplayPort HBR 3 configuration, the display bandwidth is the bandwidth of two USB SuperSpeed channels, such as 2*8.1=16.2 Gbps. If only one of the transmission interfaces 150A and 250A supports the DisplayPort HBR2 configuration, the display bandwidth is the bandwidth of two USB SuperSpeed channels, such as 2*5.4=10.8 Gbps.

However, the display bandwidth required by the DisplayPort standard in different frame rates and color depth values of the display panel 220 of the display apparatus 200-1 can be expressed by Table 1:

TABLE 1

| Image Resolution | Frame Rate (Hz) | Color Sampling | Pixel Clock (MHz) | 8-bit color depth (Gbps) | 10-bit color depth (Gbps) |
|---|---|---|---|---|---|
| 1080p/2K | 60 | 4:4:4 | 148.5 | 4.46 | 5.57 |
| QHD | 60 | 4:4:4 | 241.5 | 7.25 | 9.06 |
| 4K/UHD | 30 | 4:4:4 | 297 | 8.91 | 11.14 |
| 4K/UHD | 60 | 4:2:0 | 594 | 8.91 | 11.14 |
| 4K/UHD | 60 | 4:4:4 | 594 | 17.82 | 22.28 |

In the columns of "Image Resolution", 1080p, 2K, QHD, 4K, and UHD denotes image resolutions of 1920×1080, 2048×1080, 2560×1440, 4096×2160, and 3840×2160, respectively. Color sampling can be classified as different color sampling methods of Y:Cb:Cr=4:4:4, R:G:B=4:4:4, and Y:Cb:Cr=4:2:0. For example, in different display modes, the bandwidth required by the 8-bit color depth can be calculated first. If the 10-bit color depth is used (e.g., using a high-dynamic-range (HDR) display mode), the bandwidth consumed by the 8-bit pixel encoding to 10-bit pixel encoding should be considered, and thus the bandwidth required to use a 10-bit color depth will be more than the bandwidth required to use an 8-bit color depth.

Accordingly, when the transmission interfaces 150A and 250A respectively support the DisplayPort HBR2 and HBR3 configurations, it is possible to separately calculate whether the bandwidth of the DisplayPort HBR2 and HBR3 configurations is sufficient to support different display modes. For example, the image resolution in 8-bit color depth displayed on the display panel 220 of the display apparatus 200-1 in different modes for the HBR2 and HBR3 configurations can be expressed by Table 2:

TABLE 2

| Image resolution/Color Sampling/Color Depth | HBR2 2 Channels | HBR3 2 Channels |
| --- | --- | --- |
| 1080p/2K@60 Hz 4:4:4 8 bit | Supported | Supported |
| QHD@60 Hz 4:4:4 8 bit | Supported | Supported |
| 4K/UHD@30 Hz 4:4:4 8 bit | Supported | Supported |
| 4K/UHD@60 Hz 4:2:0 8 bit | Supported | Supported |
| 4K/UHD@60 Hz 4:4:4 8 bit | Unsupported | Unsupported |

For example, the bandwidth of the two USB SuperSpeed channels in the DisplayPort HBR2 configuration and that in the DisplayPort HBR3 configuration are 10.8 Gbps and 16.2 Gbps, respectively. The aforementioned bandwidths in the HBR2 and HBR3 configurations are compared with the values in columns of 8-bit color depth in Table 1 to obtain the columns in Table 2.

In addition, if the host 100 and the display controller 210 and display panel 220 of the display apparatus 200-1 support the display mode using a high dynamic range in 10-bit color depth, The aforementioned bandwidths in the HBR2 and HBR3 configurations are compared with the values in columns of 10-bit color depth in Table 1 to obtain the columns in Table 3:

TABLE 3

| Image resolution/Color Sampling/Color Depth | HBR2 2 Channels | HBR3 2 Channels |
| --- | --- | --- |
| 1080p/2K@60 Hz 4:4:4 10 bit | Supported | Supported |
| QHD@60 Hz 4:4:4 10 bit | Unsupported | Supported |
| 4K/UHD@30 Hz 4:4:4 10 bit | Unsupported | Supported |
| 4K/UHD@60 Hz 4:2:0 10 bit | Unsupported | Supported |
| 4K/UHD@60 Hz 4:4:4 10 bit | Unsupported | Unsupported |

Briefly, referring to Table 3, the DisplayPort HBR2 configuration is capable of supporting the display modes up to 1080p/2K@60 Hz/4:4:4/10-bit at most. The DisplayPort HBR3 configuration is capable of supporting the display modes up to 4K/UHD@60 Hz/4:2:0/10-bit at most.

Figure 2B:
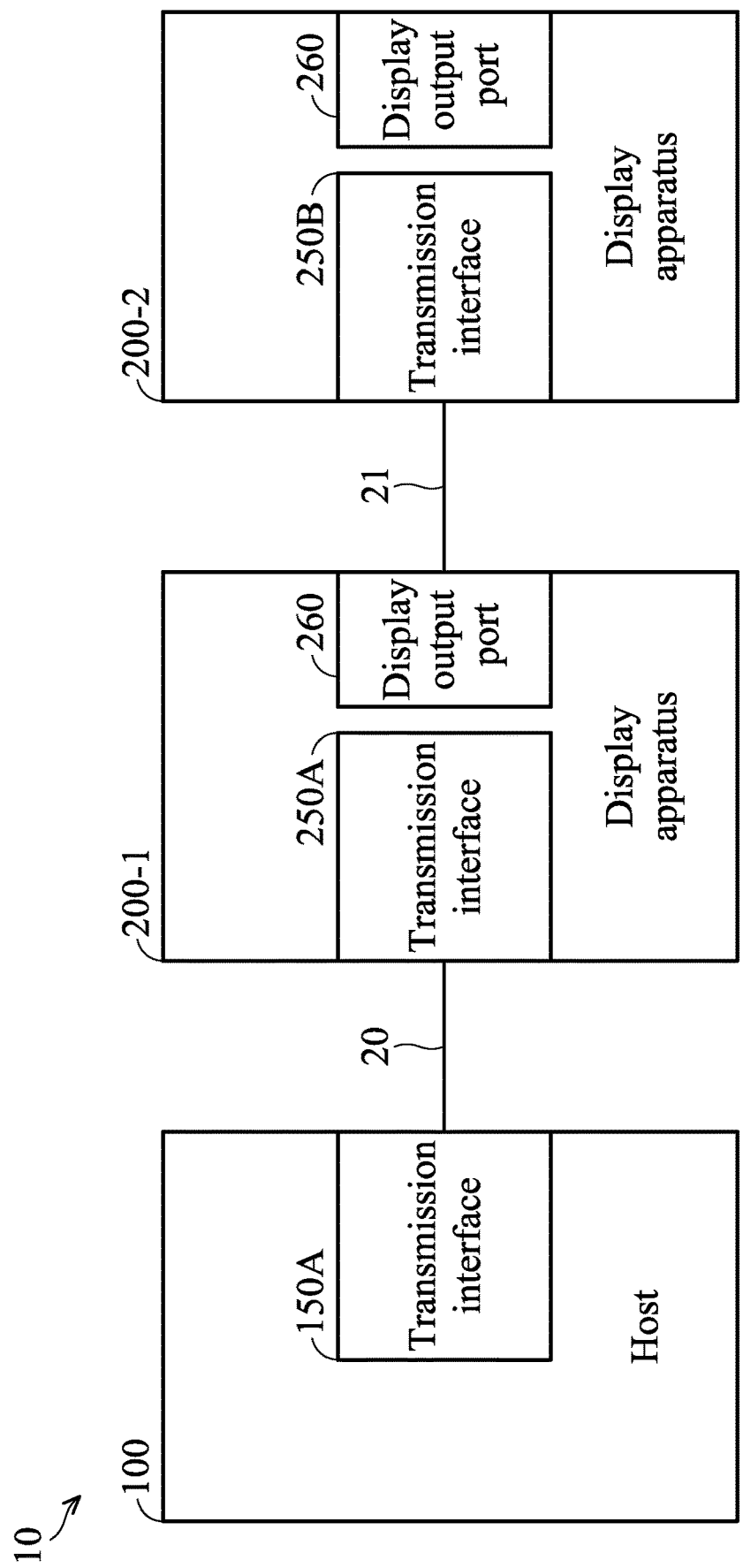
FIGS. 2B and 2C are diagrams of the connection between the host and multiple display apparatuses in accordance with an embodiment of the disclosure.
Figure 2C:
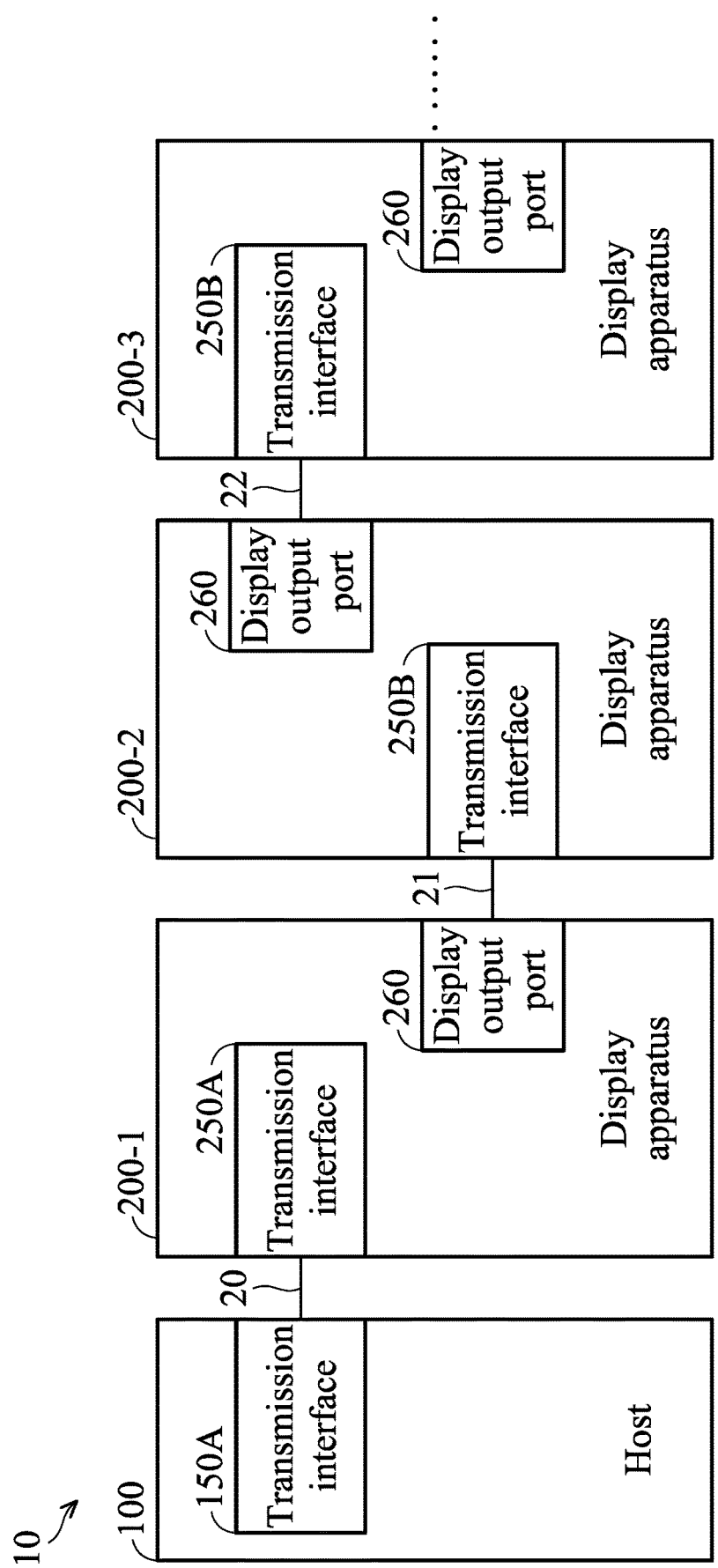

FIGS. 2B and 2C are diagrams of the connection between the host and multiple display apparatuses in accordance with an embodiment of the disclosure.

In an embodiment, since the display output port 260 of the display apparatus 200 supports the multi-stream transport (MST) function in the DisplayPort revision 1.2 and above, the host 100 can be connected to a plurality of display apparatuses 200 in serial as a "daisy chain" via the DisplayPort interface of the transmission interfaces 250 and the display output port 260 of the display apparatus 200. That is, each time the display apparatus 200 is connected in series, in the same display mode, the bandwidth required for the host 100 to transmit the image signal to the first display apparatus 200 is multiplied.

As depicted in FIG. 2B, the display apparatuses 200-1 and 200-2 are connected to the host 100 in series. The host 100 is connected to the display apparatus 200-1 via the image-transmission channel 20 between the transmission interfaces 150A and 250A (e.g., both being USB Type-C interface). When the transmission interface 250B (e.g., DisplayPort interface) in the transmission interfaces 250 of the display apparatus 200-2 is connected to the display output port 260 of the display apparatus 200-1 (e.g., a second image-transmission channel 21), the host 100 may transmit the image signal for the display apparatuses 200-1 and 200-2 to the display controller 210 of the display apparatus 200-1 via the image transmission channel 20, and the display controller 210 of the display apparatus 200-1 may output the image signal associated with the display apparatus 200-2 to the display controller (not shown) of the display apparatus 200-2 via the display output port 260 and the image-transmission channel 21.

Similarly, as depicted in FIG. 2C, the display output port 260 of the display apparatus 200-2 can be connected to the transmission interface 250B (e.g. DisplayPort interface) of the display apparatus 200-3, and the display apparatus 200-1 may transmit the image signal of the display apparatuses 200-2 and 200-3 to the display apparatus 200-2 via the image-transmission channel 21, and the display apparatus 200-2 may transmit the image signal associated with the display apparatus 200-3 to the display apparatus 200-3 via the image-transmission channel 22. If there are more display apparatuses 200 to be connected, these display apparatuses can be connected in series in a similar manner shown in FIG. 2C. It should be noted that the maximum bandwidth required for the image-transmission channel 20 is also increased every time a display apparatus 200 is connected in series.

Similarly, assuming that the display apparatuses 200-2 and 200-2 use the same display mode, the bandwidth of the DisplayPort HBR2 configuration (e.g., 10.8 Gbps) and that of the DisplayPort HBR3 configuration (e.g., 16.2 Gbps) can be compared with the values in columns of 8-bit color depth in Table 1, thereby calculating the number of display apparatuses 200 that can be connected in series in various display modes in 8-bit color depth, as shown in Table 4:

TABLE 4

| Image resolution/Color Sampling/Color Depth | HBR2 2 Channels Number in series | HBR3 2 Channels Number in series |
| --- | --- | --- |
| 1080p/2K@60 Hz 4:4:4 8 bit | 1 | 1 |
| QHD@60 Hz 4:4:4 8 bit | 0 | 1 |
| 4K/UHD@30 Hz 4:4:4 8 bit | 0 | 0 |
| 4K/UHD@60 Hz 4:2:0 8 bit | 0 | 0 |
| 4K/UHD@60 Hz 4:4:4 8 bit | 0 | 0 |

For example, in each of the display modes of 8-bit color depth, every time an additional display apparatus 200 is connected in series, the required extra bandwidth is 4.46 Gbps, 7.26 Gbps, 8.91 Gbps, 8.91 Gbps, and 17.8 Gbps, respectively. Accordingly, when there are two USB SuperSpeed channels in the DisplayPort HBR2 configuration, one display apparatus 200 can be connected in series in the display mode of 1080p/2k@60 Hz/4:4:4/8-bit or below, such as the display apparatus 200-1. When there are two USB SuperSpeed channels in the DisplayPort HBR3 configuration, one display apparatus 200 can be connected in series in the display mode of QHD@60 Hz/4:4:4/8-bit or below, such as the display apparatus 200-1.

However, if the two terminals of the first image-transmission channel 20, such as the USB Type-C interfaces 150A and 250A, from the host 100 to the display apparatus 200-1 are kept at the pin-assignment D mode (e.g., the default pin-assignment mode) of the USB Type-C interface in the DisplayPort Alternate mode, the host 100 is capable of using two USB SuperSpeed channels to transmit image signal to the display apparatus 200-1.

In the USB Type-C pin-assignment C mode in the DisplayPort Alternate mode, the host 100 may switch the two USB SuperSpeed channels that are originally used for data transmission to the USB SuperSpeed channels for image transmission. The switched two USB SuperSpeed channels can be used together with the original two USB SuperSpeed channels for image transmission, and thus there are four USB SuperSpeed channels in total to transmit the image signal. That is, the host 100 may use four USB SuperSpeed channels to transmit the image signal in the USB Type-C pin-assignment C mode in the DisplayPort Alternate mode, such as respectively using pins A11-A10, B2-B3, A2-A3, and B11-B10 in the normally plugged USB Type-C interface, or pins B11-B10, A2-A3, B2-B3, and A11-A10 in the flipped plugged USB Type-C interface as the lanes ML0, ML1, ML2, and ML3 of the DisplayPort standard.

Since the bandwidths of a single USB SuperSpeed channel in the DisplayPort HBR2 and HBR3 configurations are respectively 5.4 Gbps and 8.1 Gbps, the overall bandwidths for transmitting the image signal in the DisplayPort HBR2 and HBR3 configurations are respectively 21.6 Gbps and 32.4 Gbps when the host 100 and the display apparatus 200 respectively set the transmission interfaces 150A and 250A to the USB Type-C pin-assignment C mode in the DisplayPort Alternate mode.

Accordingly, in a similar manner described in the embodiments of Tables 2-4, it can be calculated whether the DisplayPort HBR2 and HBR3 configurations support various display modes in 8-bit and 10-bit color depth, and the number of display apparatuses can be connected in series in various display modes in 8-bit color depth.

When the USB Type-C pin-assignment C mode in the DisplayPort Alternate mode is used, the status whether the DisplayPort HBR2 and HBR3 configurations support different display modes in 8-bit color depth can be expressed by Table 5:

TABLE 5

| Image resolution/Color Sampling/Color Depth | HBR2 4 Channels | HBR3 4 Channels |
|---|---|---|
| 1080p/2K@60 Hz 4:4:4 8 bit | Supported | Supported |
| QHD@60 Hz 4:4:4 8 bit | Supported | Supported |
| 4K/UHD@30 Hz 4:4:4 8 bit | Supported | Supported |
| 4K/UHD@60 Hz 4:2:0 8 bit | Supported | Supported |
| 4K/UHD@60 Hz 4:4:4 8 bit | Supported | Supported |

When Table 2 is compared with Table 5, it will be appreciated that when the USB Type-C pin-assignment C mode in the DisplayPort Alternate mode is used, the DisplayPort HBR2 or HBR3 configuration is capable of supporting the display mode up to 4K/UHD@60 Hz/4:4:4/8-bit.

When the USB Type-C pin-assignment C mode in the DisplayPort Alternate mode is used, the status whether the DisplayPort HBR2 and HBR3 configurations support different display modes in 10-bit color depth can be expressed by Table 6:

TABLE 6

| Image resolution/Color Sampling/Color Depth | HBR2 4 Channels | HBR3 4 Channels |
|---|---|---|
| 1080p/2K@60 Hz 4:4:4 10 bit | Supported | Supported |
| QHD@60 Hz 4:4:4 10 bit | Supported | Supported |
| 4K/UHD@30 Hz 4:4:4 10 bit | Supported | Supported |
| 4K/UHD@60 Hz 4:2:0 10 bit | Supported | Supported |
| 4 K/UHD@60 Hz 4:4:4 10 bit | Unsupported | Supported |

When Table 3 is compared with Table 6, it will be appreciated that when the USB Type-C pin-assignment C mode in the DisplayPort Alternate mode is used, the DisplayPort HBR2 configuration is capable of supporting the display mode up to 4K/UHD@60 Hz/4:2:0/10-bit, and the DisplayPort HBR3 configuration is capable of supporting the display mode up to 4K/UHD@60 Hz/4:4:4/10-bit.

When the USB Type-C pin-assignment C mode in the DisplayPort Alternate mode is used, the number of display apparatuses 200 that can be connected in series in various display modes in 8-bit color depth for the DisplayPort HBR2 and HBR3 configurations are shown in Table 7:

TABLE 7

| Image resolution/Color Sampling/Color Depth | HBR2 4 Channels Number in series | HBR3 4 Channels Number in series |
|---|---|---|
| 1080p/2K@60 Hz 4:4:4 8 bit | 3 | 6 |
| QHD@60 Hz 4:4:4 8 bit | 1 | 3 |
| 4K/UHD@30 Hz 4:4:4 8 bit | 1 | 2 |
| 4K/UHD@60 Hz 4:2:0 8 bit | 1 | 2 |
| 4K/UHD@60 Hz 4:4:4 8 bit | 0 | 0 |

Since the bandwidth of four USB SuperSpeed channels is used, an additional display apparatus 200 can be connected in series in the DisplayPort HBR2 configuration operated in the display mode of 4K/UHD@60 Hz/4:2:0/8-bit, and three additional display apparatuses 200 can be connected in series in the DisplayPort HBR2 configuration operated in the display mode of 1080p/2K@60 Hz/4:4:4/8-bit. In addition, two additional display apparatuses 200 can be connected in series in the DisplayPort HBR3 configuration operated in the display mode of 4K/UHD@60 Hz/4:2:0/8-bit, and 6 additional display apparatuses 200 can be connected in series in the DisplayPort HBR3 configuration operated in the display mode of 1080p/2K@60 Hz/4:4:4/8-bit.

In an embodiment, the display controller 210 of the display apparatus 200-1 may determine whether to use high display bandwidth (i.e., using 4 USB SuperSpeed channels to transmit the image signal) according to the display settings (e.g., image resolution or whether the HDR function is activated) of the display apparatus 200-1 and the activation status of the DisplayPort MST function (e.g., whether the display output port 260 is connected one or more display apparatuses 200 in series). For example, when the display controller 210 of the display apparatus 200-1 is to determine whether to use the high display bandwidth, the display controller 210 may determine whether to deactivate the MST function of the display apparatus 200 and the USB Type-C pin-assignment D mode.

For example, the display controller 210 may determine whether to switch the USB Type-C pin-assignment D mode to the pin-assignment C mode to support the current display mode and the serial connection according to the content in Table 2~Table 7 (e.g., pre-stored in the firmware 231).

Briefly, if the image resolution of 4K or above is used, the HDR function is activated, or the DisplayPort MST function is activated by the display apparatus 200-1, the display controller 210 may determine that the high display bandwidth is to be used. Meanwhile, the display controller 210 may issue the PD control signal 283 to the PD controller 272, thereby modifying the values stored in the registers 2721 and 2722 in the PD controller 272, thereby deactivating the MST function and the USB Type-C pin-assignment D mode.

If the image resolution of 4K or above is not used, the HDR function is not activated, and the DisplayPort MST function is not activated by the display apparatus 200-1, the display controller 210 may determine that the USB Type-C pin-assignment D mode can be maintained, and no further action is performed.

It should be noted that when the HDR function of the display apparatus 200-1 is activated in the aforementioned embodiment, it indicates that both the display apparatus 200-1 and the host 100 (including the GPU 120 and the application 141 and OS 142 executed by the processing unit 110) support and activate the HDR function.

In addition, the channel controller 271 may determine whether the pin signals CC1 and CC2 of the transmission interface 250A (e.g., USB Type-C interface) are enabled according to the channel-enable signal 280 from the display controller 210.

For example, the pin signals CC1 and CC2 (e.g., CC-channel signal 282) of the transmission interface 250A (e.g., USB Type-C interface) are connected to the pins USBCU0_CC1_CON and USBCU0_CC2_CON of the channel controller 271, and the pins USBCU0_CC1_PD and USBCU0_CC2_PD (e.g., CC-channel signal 281) of the channel controller 271 is connected to the pins CC1 and CC2 of the PD controller 272.

When the channel-enable signal 280 generated by the display controller 210 is in a high-logic state, the channel controller 271 may transmit the pin signals CC1 and CC2 of the CC-channel signal 282 from the transmission interface 250A respectively to the pins CC1 and CC2 of the PD controller 272. When the channel-enable signal 280 generated by the display controller 210 is in a low-logic state, the channel controller 271 may disconnect the CC-channel signal 282 (i.e., from the transmission interface 250A) from the PD controller 272.

It should be noted that when the display controller 210 determines that the high display bandwidth is not required, the channel-enable signal 280 generated by the display controller 210 will be maintained at the high-logic state. When the display controller 210 determines that the high display bandwidth is required, the display controller 210 may transmit the PD control signal 283 to the PD controller 272 to modify the values stored in the registers 2721 and 2722, thereby controlling the PD controller 272 to deactivate the MST mode and the pin-assignment D mode.

Afterwards, the display controller 210 may change the channel-enable signal 280 from the high-logic state to the low-logic state. Meanwhile, the channel controller 271 may disconnect the CC-channel signal 282 (e.g., from the transmission interface 250A) from the PD controller 272, and the host 100 may determine that the display apparatus 200-1 is disconnected from the host 100 according to the CC pins of the transmission interface 150A.

Then, the display controller 210 may change the channel-enable signal 280 from the low-logic state to the high-logic state, so that the host 100 may recognize that the display apparatus 200-1 has been reconnected to the host 100 according to the CC pins of the transmission interface 150A. Accordingly, the host 100 and the PD controller 272 of the display apparatus 200-1 can renegotiate with each other using the USB Type-C protocol. Since the PD controller 272 has deactivated the DisplayPort MST function and the USB Type-C pin-assignment D mode at this time, the host 100 and the PD controller 272 may respectively set the transmission interfaces 150A and 250A to the USB Type-C pin-assignment C mode after re-negotiation, and the host 100 is capable of transmitting the image signal to the display apparatus 200-1 via four USB SuperSpeed channels, thereby achieving the high display bandwidth. It should be noted that if the transmission interfaces 150A and 250A are to be set to the USB Type-C pin-assignment C mode, the value stored in the register 2721 of the PD controller 272 should correspond to the deactivation status of the DisplayPort MST function, and the value stored in the register 2722 of the PD controller 272 should correspond to the USB Type-C pin-assignment C mode. If one of the registers 2721 and 2722 is not modified to the corresponding values (i.e., deactivated DisplayPort MST function and pin-assignment C mode), the host 100 and the PD controller 272 of the display apparatus 200-1 may still set the transmission interfaces 150A and 250A to the USB Type-C pin-assignment D mode after the re-negotiation between the host and the PD controller 272.

For example, when the transmission interface 250A is in the pin-assignment D mode, two of four USB SuperSpeed channels are used for data transmission, and another two of four USB SuperSpeed channels are used for image transmission. That is, the data signal 284 shown in FIG. 1 may include the data signal of two USB SuperSpeed channels and the image signal of another two USB SuperSpeed channels, and the PD controller 272 may use the switch-control signal 288 to control the multiplexer 273 to forward the image signal from two USB SuperSpeed channels to the display controller 210, and forward the data signal from two USB SuperSpeed channels to the USB hub 270.

When the transmission interface 250A is set to the pin-assignment C mode, four USB SuperSpeed channels of the transmission interface 250A are for image transmission. That is, the data signal 284 shown in FIG. 1 may include the image signal of four USB SuperSpeed channels, and the PD controller 272 may use the switch-control signal 288 to control the multiplexer 273 to forward the image signal from four USB SuperSpeed channels to the display controller 210. In addition, the USB SuperSpeed data signal 286 of two USB SuperSpeed channels that was previously forwarded to the USB hub 270 by the multiplexer 273 is deactivated. The display controller 210 may transmit the image signal associated with the display apparatus 200-2 and subsequent display apparatuses connected in series to the display apparatus 200-2 and subsequent display apparatuses via the display output port 260.

It should be noted that when the four USB SuperSpeed channels of the transmission interface 250A has been switched to the USB Type-C pin-assignment C mode, the transmission interface 250A is still capable of transmitting data to the USB hub 270 via the USB HighSpeed data signal 285 in the USB HighSpeed channels (i.e., compatible with D+ and D− pins in the USB 2.0 standard) regardless of the four USB SuperSpeed channels not being capable of transmitting data.

Figure 3:
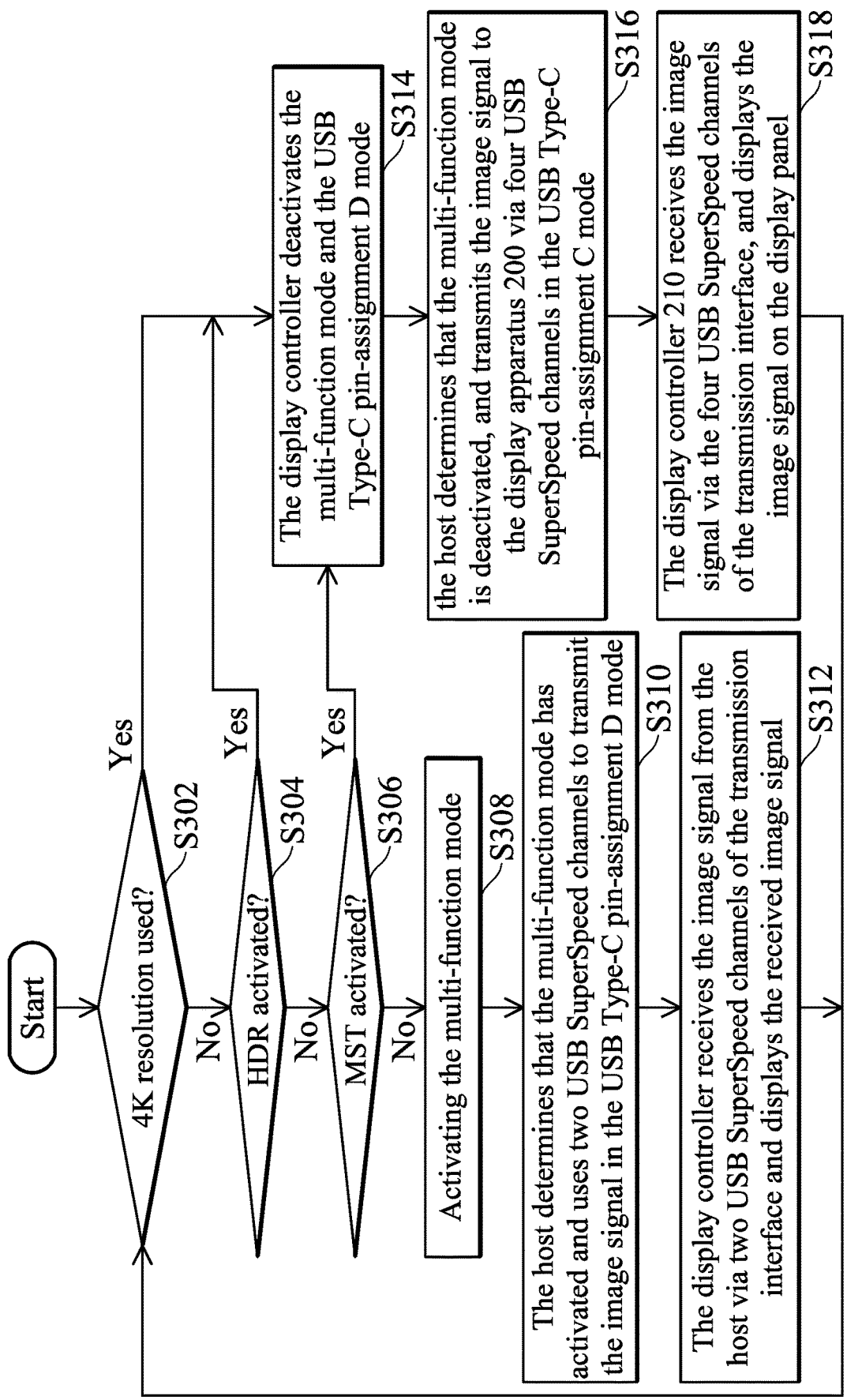
FIG. 3 is a flow chart of a control method for high display bandwidth in accordance with an embodiment of the disclosure.

FIG. 3 is a flow chart of a control method for high display bandwidth in accordance with an embodiment of the disclosure.

Referring to FIG. 1 and FIG. 3, in step S302, the display controller 210 determines whether the display screen of the display apparatus 200 uses 4K resolution. If it is determined that the display screen of the display apparatus 200 uses 4K resolution, step S314 is performed. If it is determined that the display screen of the display apparatus 200 does not use 4K resolution, step S304 is performed.

In step S304, the display controller 210 determines whether the display apparatus 200 has activated the high-dynamic-range (HDR) function. If it is determined that the display apparatus 200 has activated the HDR function, step S314 is performed. If it is determined that the display apparatus 200 has not activated the HDR function, step S306 is performed.

In step S306, the display controller 210 determines whether the display apparatus 200 has activated the DisplayPort MST function (i.e., supported by DisplayPort revision 1.2 and above). If it is determined that the display apparatus 200 has activated the DisplayPort MST function, step S314 is performed. If it is determined that the display apparatus 200 has not activated the DisplayPort MST function, step S308 is performed.

For example, if any one of the three determination conditions in steps S302, S304, and S306 is satisfied, the display controller 210 may determine that high display bandwidth is required for the display apparatus 200, and perform subsequent control operations. If all of the three determination conditions in steps S302, S304, and S306 are not satisfied, the display controller 210 may determine that high display bandwidth is not required for the display apparatus 200.

In step S308, the display controller 210 activates the multi-function mode. For example, the display controller 210 may use the PD control signal 283 to control the PD controller 272 to activate or deactivate the multi-function mode and the pin-assignment D mode. If the multi-function mode and the pin-assignment D mode are deactivated (i.e., the pin-assignment C mode for high display bandwidth is used) while performing step S308, the display controller 210 may use the PD control signal 283 to control the PD controller 272 to activate the multi-function mode and the pin-assignment D mode. Then, the display controller 210 may set the channel-control signal 280 to the low-logic state, and then set the channel-control signal 280 to the high-logic state, so that the host 100 may detect that the display apparatus 200 has been reconnected, and activates the multi-function mode and pin-assignment D mode. If the multi-function mode and the pin-assignment D mode are activated while performing step S308, the display controller 210 may take no action.

In step S310, the host 100 determines that the multi-function mode has activated and uses two USB SuperSpeed channels to transmit the image signal in the USB Type-C pin-assignment D mode. For example, when the host 100 is in the USB Type-C pin-assignment D mode, the host 100 may use two USB SuperSpeed channels of the transmission interface 150A to transmit the image signal and use another two USB SuperSpeed channels of the transmission interface 150A to transmit the data signal.

In step S312, the display controller 210 receives the image signal from the host via two USB SuperSpeed channels of the transmission interface 250A and displays the received image signal. For example, the data signal 284 received by the transmission interface 250A of the display apparatus 200 may include a data signal from two USB SuperSpeed channels and an image signal from another two USB SuperSpeed channels. The PD controller 272 may use the switch-control signal 288 to control the multiplexer 273 to forward the image signal from two USB SuperSpeed channels to the display controller 210, and forward the data signal from another two USB SuperSpeed channels to the USB hub 270. In the USB Type-C pin-assignment D mode, the display controller 210 may directly display the image signal 287 on the display panel 210.

In step S314, the display controller deactivates the multi-function mode and the USB Type-C pin-assignment D mode. For example, if the multi-function mode and the pin-assignment D mode have been activated (i.e., the pin-assignment C mode for high display bandwidth is not used) while performing step S314, the display controller 210 may use the PD control signal 283 to control the PD controller 272 to deactivate the multi-function mode and the pin-assignment D mode. Then, the display controller 210 may set the channel-control signal 280 to the low-logic state, so that the host 100 may detect that the display apparatus 200 has been disconnected from the host 100. The display controller 210 may then set the channel-control signal 280 to the high-logic state, so that the host 100 may detect that the display apparatus 200 has been reconnected, deactivate the multi-function mode, and use the pin-assignment C mode. If the multi-function mode and the pin-assignment D mode are activated while performing step S308, the display controller 210 may take no action.

In step S316, the host 100 determines that the multi-function mode is deactivated, and transmits the image signal to the display apparatus 200 via four USB SuperSpeed channels in the USB Type-C pin-assignment C mode. For example, in the USB Type-C pin-assignment C mode, the host 100 may use four USB SuperSpeed channels of the transmission interface 150A (e.g., USB Type-C interface) to transmit the image signal.

In step S318, the display controller 210 receives the image signal via the four USB SuperSpeed channels of the transmission interface 250A, and displays the image signal on the display panel. For example, the data signal 284 received by the transmission interface 250A of the display apparatus 200 includes the image signal from four USB SuperSpeed channels, and the PD controller 272 may use the switch-control signal 288 to control the multiplexer 273 to forward the data signal 284 from the four USB SuperSpeed channels to the display controller 210. In the USB Type-C pin-assignment C mode, the display controller 210 may determine whether to directly display the image signal 287 on the display panel 220 or whether to transmit the image signal associated with the display apparatuses 200 connected in series to the display apparatuses 200 (e.g., display apparatuses 200-2, 200-3, etc.) via the display output port 260.

Figure 4A:
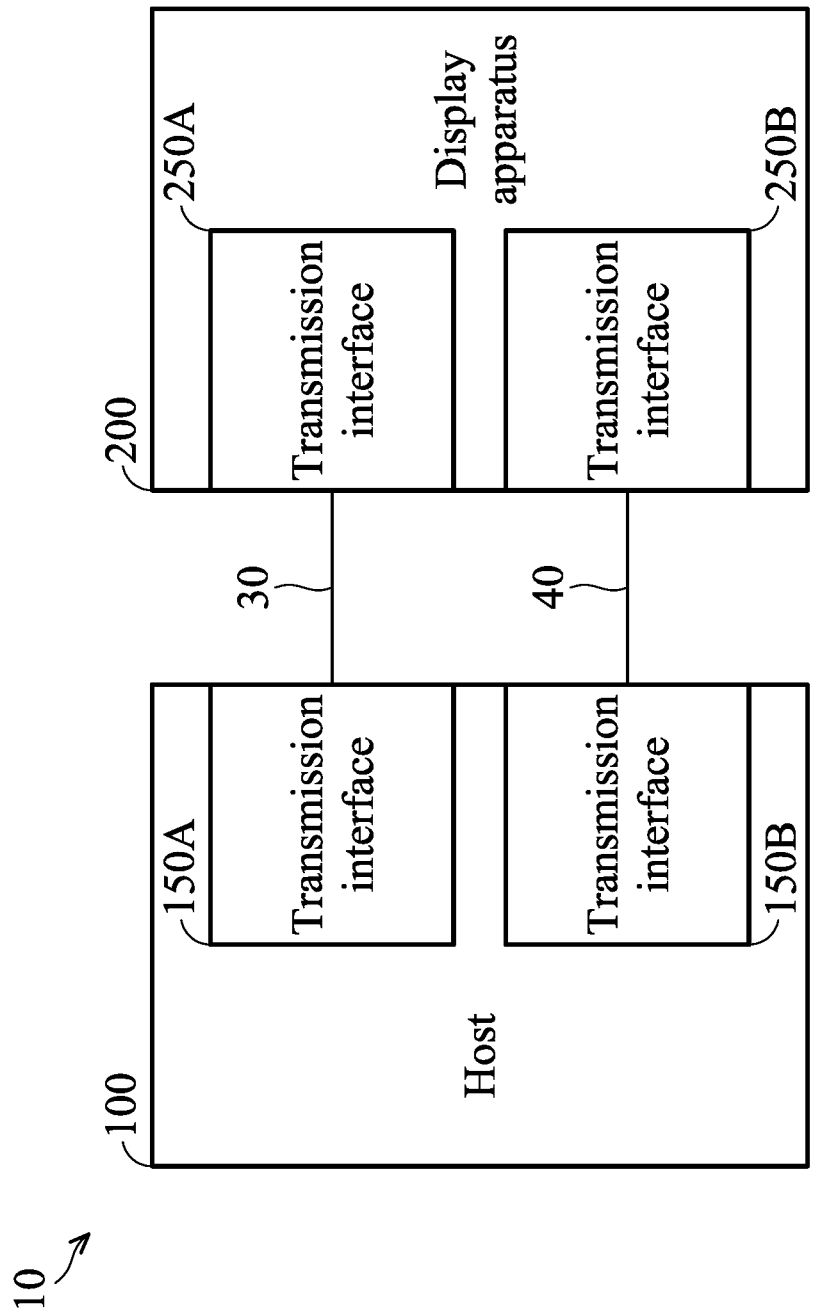
FIG. 4A is a diagram of the connection between the host and the display apparatus in accordance with another embodiment of the disclosure.

FIG. 4A is a diagram of the connection between the host and the display apparatus in accordance with another embodiment of the disclosure.

In another embodiment, the computer system 10 may be a personal computer or a server equipped with a display apparatus. As depicted in FIG. 4A, the host 100 is connected to the display apparatus 200 via a channel 30 between the transmission interfaces 150A and 250A and a channel 40 between the transmission interfaces 150B and 250B. The channel 30 can be regarded as a data-transmission channel, and the data signal generated by the host 100 is transmitted to the USB hub 270 of the display apparatus 200 via the transmission interface 150A (e.g., USB-C interface) of the host 100 and the transmission interface 250A (e.g., USB-C interface) of the display apparatus 200. In addition, the channel 40 can be regarded as an image-transmission channel, and the image signal generated by the GPU 120 of the host 100 is transmitted to the display controller 210 of the display apparatus 200 via the transmission interface 150B of the host 100 and the transmission interface 250B of the display apparatus 200. The transmission interfaces 150B and 250B may be display interfaces other than the USB Type-C interface.

It should be noted that the USB Type-C protocol can support audio and video transmission (e.g. supporting the DisplayPort standard), it also provides high-speed data transmission, which can combine image transmission channels and data transmission channels. However, in the embodiment, the image signal is transmitted from the host 100 to the display apparatus 200 via the image-transmission channel 40. In the embodiment, the host 100 and the display apparatus 200 may support the USB 3.2 Gen2×2 standard, and it indicates that the PD controller 272 and the USB hub 270 of the display apparatus 200 may support the USB 3.2 Gen2×2 standard. In addition, an external USB device that supports the USC-C interface can be connected to the display apparatus 200 via the USB output port 261 which is an USB-C interface.

Figure 4B:
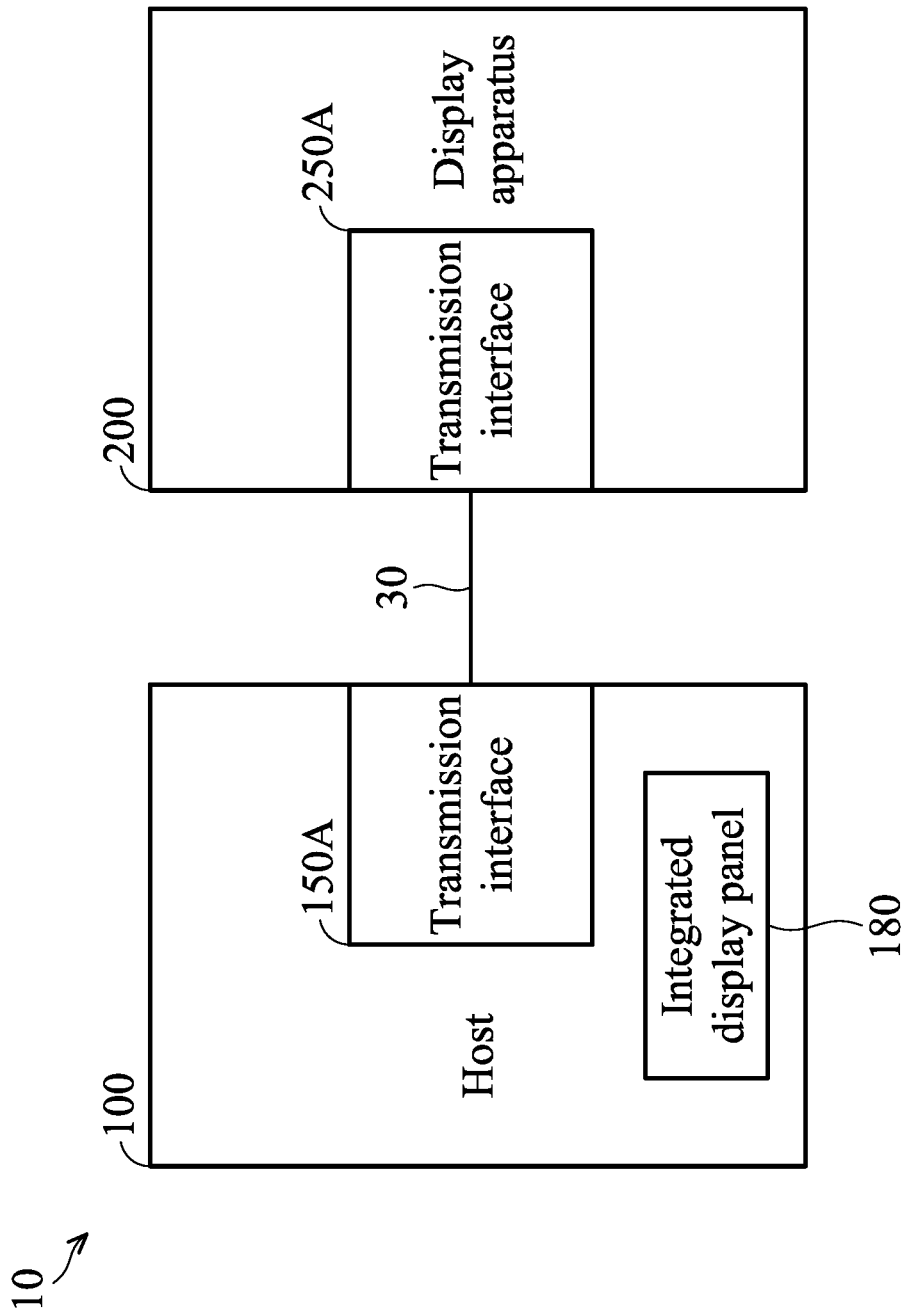
FIG. 4B is a diagram of the connection between the host and the display apparatus in accordance with yet another embodiment of the disclosure.

FIG. 4B is a diagram of the connection between the host and the display apparatus in accordance with yet another embodiment of the disclosure.

In yet another embodiment, the host 100 may be a laptop that includes an integrated display panel 180. The integrated display panel 180, for example, may be a liquid-crystal display panel, a light-emitting diode (LED) display panel, an organic light-emitting diode (OLED) display panel, but the disclosure is not limited thereto. The integrated display panel 180 may be connected to the processing unit 110 and/or the GPU 120 via a display transmission interface such as an embedded DisplayPort (eDP) interface, but the disclosure is not limited thereto.

In the embodiments of FIG. 4A and FIG. 4B, the data signal generated by the host 100 is transmitted via the channel 30 between the transmission interfaces 150A and 250A that are USB-C interfaces, but the image signal generated by the GPU 120 is not transmitted to the display apparatus 200 via the channel 30 between the transmission interfaces 150A and 250A. For example, in the embodiment of FIG. 4A, the image signal generated by the GPU 120 of the host 100 is transmitted to the display apparatus 200 via the channel 40 between the transmission interfaces 150B and 250B. In the embodiment of FIG. 4B, the image signal generated by the GPU 120 of the host 100 is transmitted to the integrated display panel 180 of the host 100.

There are three different configurations defined in the USB 3.2 standard, namely USB 3.2 Gen1, USB 3.2 Gen2, and USB 3.2 Gen2×2. For example, the USB 3.2 Gen1 standard supports the bandwidth up to 5 Gbps, and one USB SuperSpeed channel of the USB-C interface is used in the USB 3.2 Gen1 standard. The USB 3.2 Gen2 standard supports the bandwidth up to 10 Gbps, and two USB SuperSpeed channels of the USB-C interface are used in the USB 3.2 Gen2 standard. The USB 3.2 Gen2×2 standard supports the bandwidth up to 20 Gbps, and four USB SuperSpeed channels of the USB-C interface are used in the USB 3.2 Gen2×2 standard.

In addition, there are some limits for the configurations defined in the USB 3.2 standard. For example, when the multi-function mode of the display apparatus 200 is activated, at most two USB SuperSpeed channels (i.e. 10 Gbps bandwidth) are used for data transmission. That is, while the multi-function mode of the display apparatus 200 is activated, the USB 3.2 Gen1 and USB 3.2 Gen2 configurations are supported, and the USB 3.2 Gen2×2 configuration is not supported. When the multi-function mode and the DisplayPort alternate mode of the display apparatus 200 are deactivated, the USB 3.2 Gen2×2 protocol that support at most 20 Gbps bandwidth (i.e., 4 USB SuperSpeed channels are used) can be used.

Specifically, in the embodiments of FIG. 4A and FIG. 4B, the transmission interfaces 150A and 250A (i.e., USB type-C interfaces) are not used for transmission of the image signal, and it indicates that all of the four USB SuperSpeed channels of the USB type-C interface can be used for data transmission. In other words, when the display controller 210 determines that high data bandwidth is required, the display controller 210 may initiate a procedure to enable the USB 3.2 Gen2×2 protocol for the high data bandwidth. For example, in the embodiment of FIG. 4A, if the user manually configures the display apparatus 200 to enable the high data-bandwidth mode compatible with the USB 3.2 Gen2×2 protocol via physical buttons (not shown in FIG. 1) of display apparatus 200, the display controller 210 may initiate the aforementioned procedure to activate the high data-bandwidth mode. Additionally, in the embodiments of FIG. 4A and FIG. 4B, if the display controller 210 detects that the channel 30 between transmission interfaces 150A and 250A (i.e., USB type-C interfaces) is not used for image transmission, the display controller 210 may also initiate the aforementioned procedure to activate the high data-bandwidth mode. Details of the aforementioned procedure to activate the high data-bandwidth mode will be described in the following sections.

In an embodiment, the PD controller 272 may modify the values stored in registers 2721 and 2722 according to the PD-control signal 283 from the display controller 210. For example, the register 2721 (e.g., a first register) is configured to record a status of the multi-function mode of the display apparatus 200. The register 2722 (e.g., a second register) is configured to record a pin-assignment mode of the display apparatus 200. Specifically, the PD controller 272 may activate or deactivate the multi-function mode of the display apparatus and the pin-assignment D mode (i.e., the default pin-assignment mode) of the USB Type-C interface. When the display controller 210 determines that the aforementioned procedure to enable the USB 3.2 Gen2×2 protocol for high data bandwidth is to be performed, the display controller 210 may issue the PD control signal 283 to the PD controller 272 to modify the values stored in the registers 2721 and 2722 in the PD controller, thereby deactivating the multi-function mode and USB Type-C pin-assignment D mode.

Afterwards, the channel controller 271 may determine whether the pin signals CC1 and CC2 of the transmission interface 250A (e.g., USB Type-C interface) are enabled according to the channel-enable signal 280 from the display controller 210. For example, the pin signals CC1 and CC2 (e.g., CC-channel signal 282) of the transmission interface 250A (e.g., USB Type-C interface) are connected to the pins USBCU0_CC1_CON and USBCU0_CC2_CON of the channel controller 271, and the pins USBCU0_CC1_PD and USBCU0_CC2_PD (e.g., CC-channel signal 281) of the channel controller 271 is connected to the pins CC1 and CC2 of the PD controller 272.

When the channel-enable signal 280 generated by the display controller 210 is in a high-logic state, the channel controller 271 may transmit the pin signals CC1 and CC2 of the CC-channel signal 282 from the transmission interface 250A respectively to the pins CC1 and CC2 of the PD controller 272. When the channel-enable signal 280 generated by the display controller 210 is in a low-logic state, the channel controller 271 may disconnect the CC-channel signal 282 (i.e., from the transmission interface 250A) from the PD controller 272.

When the display controller 210 determines that the high data bandwidth is not required, the channel-enable signal 280 generated by the display controller 210 will be maintained at the high-logic state. When the display controller 210 determines that the high data bandwidth is required, the display controller 210 may transmit the PD control signal 283 to the PD controller 272 to modify the values stored in the registers 2721 and 2722, thereby controlling the PD controller 272 to deactivate the multi-function mode and the USB Type-C pin-assignment D mode.

Afterwards, the display controller 210 may change the channel-enable signal 280 from the high-logic state to the low-logic state. Meanwhile, the channel controller 271 may disconnect the CC-channel signal 282 (e.g., from the transmission interface 250A) from the PD controller 272, and the host 100 may determine that the display apparatus 200 is disconnected from the host 100 according to the CC pins of the transmission interface 150A.

Then, the display controller 210 may change the channel-enable signal 280 from the low-logic state to the high-logic state, so that the host 100 may recognize that the display apparatus 200 has been reconnected to the host 100 according to the CC pins of the transmission interface 150A. Accordingly, the host 100 and the PD controller 272 of the display apparatus 200 can renegotiate with each other using the USB Type-C protocol. Since the PD controller 272 has deactivated the multi-function mode and the USB Type-C pin-assignment D mode at this time, the host 100 and the PD controller 272 may respectively set the transmission interfaces 150A and 250A to the high data-bandwidth mode of the USB 3.2 Gen2×2 protocol after re-negotiation, and the host 100 is capable of transmitting data to the display apparatus 200 via four USB SuperSpeed channels, thereby achieving the high data bandwidth. It should be noted that if the transmission interfaces 150A and 250A are to be set to the high data-bandwidth mode of the USB 3.2 Gen2×2 protocol, the value stored in the register 2721 of the PD controller 272 should correspond to the deactivation status of the multi-function mode, and the value stored in the register 2722 of the PD controller 272 should correspond to the deactivation status of the USB Type-C pin-assignment D mode (i.e., all pin assignments modes are disabled). If one of the registers 2721 and 2722 is not modified to the corresponding values (i.e., deactivated multi-function mode and USB Type-C pin-assignment D mode), the host 100 and the PD controller 272 of the display apparatus 200-1 may still set the transmission interfaces 150A and 250A to the USB Type-C pin-assignment D mode after the re-negotiation between the host and the PD controller 272.

In response to the transmission interfaces 250A entering the high data-bandwidth mode to use four USB SuperSpeed channels for data transmission, the PD controller 272 may issue a switch-control signal 288 to the multiplexer 273, so that the multiplexer 273 may transmit the data signal received by the four USB SuperSpeed channels of the USB Type-C interface of the transmission interface 250 of the display apparatus 200 to the USB hub 270. Thus, the external USB device that is connected to the apparatus via the USB output port 261 and compatible with the USB 3.2 Gen2×2 protocol may perform data transmission with the host 100 using the high data bandwidth supported by the USB 3.2 Gen2×2 protocol.

Figure 5:
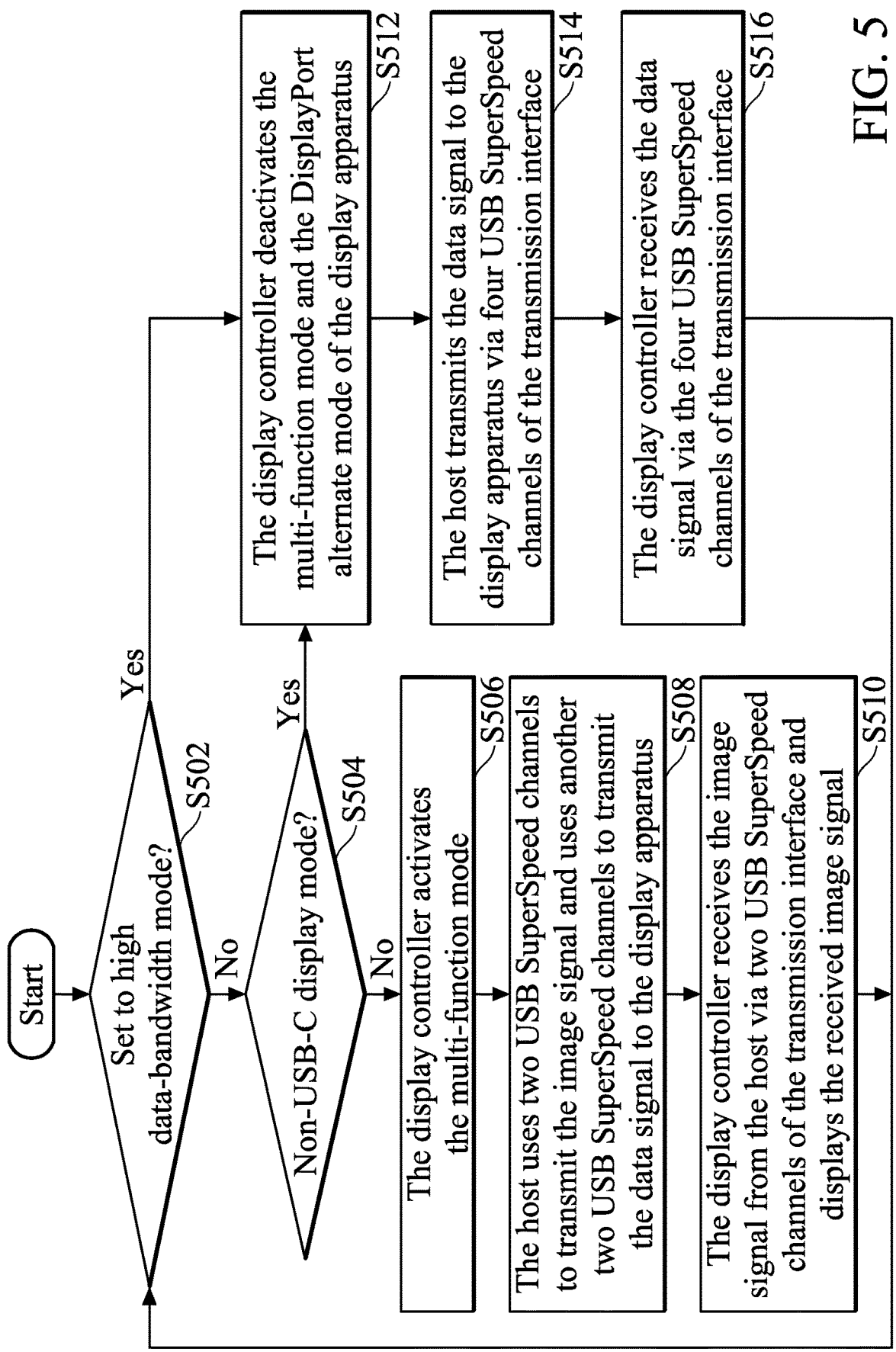
FIG. 5 is a flow chart of a control method for high data bandwidth in accordance with an embodiment of the disclosure.

FIG. 5 is a flow chart of a control method for high data bandwidth in accordance with an embodiment of the disclosure.

Referring to FIG. 1, FIGS. 4A~4B, and FIG. 5, in step S502, the display controller 210 determines whether the display apparatus 200 is set to a high data-bandwidth mode. If it is determined that the display apparatus 200 is set to the high data-bandwidth mode, step S512 is performed. If it is determined that the display apparatus 200 is not set to the high data-bandwidth mode, step S504 is performed. For example, the user may manually configure the display apparatus 200 to activate the high data-bandwidth mode compatible with the USB 3.2 Gen2×2 protocol via physical buttons (not shown in FIG. 1) of display apparatus 200, the display controller 210 may initiate the procedure to activate the high data-bandwidth mode, such as steps S512 to S516.

In step S504, the display controller 210 determines whether a non-USB-C display mode is currently used. When the display controller 210 determines that the non-USB-C display mode is currently used, step S512 is performed. When the display controller 210 determines that the non-USB-C display mode is not currently used, step S506 is performed.

Specifically, when the non-USB-C display mode is currently used by the display controller 210, it indicates that the display controller 210 may receive the image signal from the transmission interface other than the USB-C interface (e.g., FIG. 4A) or the display controller 210 does not receive the image signal (e.g., FIG. 4B). For example, as shown in FIG. 4A, the image signal may be transmitted from the host 100 to the display apparatus via the channel 40 between the transmission interfaces 150B and 250B (i.e., non-USB-C display interfaces). Alternatively, as shown in FIG. 4B, the host 100 may display the image signal on the integrated display panel 180, and the display controller 210 does not receive the image signal.

For example, if the display controller 210 does not receive the image signal via the USB-C interface, it indicates that the four USB SuperSpeed channels are available for data transmission. If the display controller 210 receives the image signal via the USB Type-C interface, it indicates that at least two of the four USB SuperSpeed channels are used for image transmission.

In the embodiment, if any one of the two determination conditions in steps S502 and S504 is satisfied, the display controller 210 may determine that high data-bandwidth mode of the display apparatus 200 is required, and perform subsequent control operations. If both two determination conditions in steps S502 and S504 are not satisfied, the display controller 210 may determine that high data-bandwidth is not required for the display apparatus 200.

In step S506, the display controller 210 activates the multi-function mode. For example, the display controller 210 may use the PD control signal 283 to control the PD controller 272 to activate or deactivate the multi-function mode and the DisplayPort alternate mode. If the multi-function mode and the DisplayPort alternate mode (i.e., pin-assignment D mode by default) are deactivated while performing step S506, the display controller 210 may use the PD control signal 283 to control the PD controller 272 to activate the multi-function mode and the DisplayPort alternate mode. Then, the display controller 210 may set the channel-control signal 280 to the low-logic state, and then set the channel-control signal 280 to the high-logic state, so that the host 100 may detect that the display apparatus 200 has been reconnected, and activates the multi-function mode and the DisplayPort alternate mode (i.e., pin-assignment D mode by default). If the multi-function mode and the DisplayPort alternate mode are activated while performing step S506, the display controller 210 may take no action.

In step S508, the host 100 uses two USB SuperSpeed channels to transmit the image signal and uses another two USB SuperSpeed channels to transmit the data signal to the display apparatus 200. For example, when the multi-function mode and DisplayPort alternate mode (i.e., pin-assignment D mode by default) of the display apparatus 200 are activated, the host 100 may use two USB SuperSpeed channels of the transmission interface 150A to transmit the image signal and use another two USB SuperSpeed channels of the transmission interface 150A to transmit the data signal.

In step S510, the display controller 210 receives the image signal from the host via two USB SuperSpeed channels of the transmission interface 250A and displays the received image signal. For example, the signal 284 received by the transmission interface 250A of the display apparatus 200 may include a data signal from two USB SuperSpeed channels and an image signal from another two USB SuperSpeed channels. The PD controller 272 may use the switch-control signal 288 to control the multiplexer 273 to forward the image signal from two USB SuperSpeed channels to the display controller 210, and forward the data signal from another two USB SuperSpeed channels to the USB hub 270. In the USB Type-C pin-assignment D mode of the DisplayPort alternate mode, the display controller 210 may directly display the image signal 287 on the display panel 210.

In step S512, the display controller deactivates the multi-function mode and the DisplayPort alternate mode of the display apparatus. For example, if the multi-function mode and the DisplayPort alternate mode have been activated while performing step S314, the display controller 210 may use the PD control signal 283 to control the PD controller 272 to deactivate the multi-function mode and the DisplayPort alternate mode. Then, the display controller 210 may set the channel-control signal 280 to the low-logic state, so that the host 100 may detect that the display apparatus 200 has been disconnected from the host 100. The display controller 210 may then set the channel-control signal 280 to the high-logic state, so that the host 100 may detect that the display apparatus 200 has been reconnected, deactivate the multi-function mode and the DisplayPort alternate mode.

In step S514, the host 100 transmits the data signal to the display apparatus 200 via four USB SuperSpeed channels. For example, when the multi-function mode and the DisplayPort alternate mode have been deactivated, the host 100 may use four USB SuperSpeed channels of the transmission interface 150A (e.g., USB Type-C interface) to transmit the data signal.

In step S516, the display controller 210 receives the data signal via the four USB SuperSpeed channels of the transmission interface 250A. For example, the signal 284 received by the transmission interface 250A of the display apparatus 200 includes the data signal from four USB SuperSpeed channels, but does not include the image signal at this time. The PD controller 272 may use the switch-control signal 288 to control the multiplexer 273 to forward the signal 284 from the four USB SuperSpeed channels to the USB hub 270, so that the external USB device that is connected to the USB output port 261 (i.e., a USB downstream port) and compatible with USB 3.2 Gen2×2 standard may communicate with the host 100 using four USB SuperSpeed channels, thereby achieving high data bandwidth.

In view of the above, a display apparatus and a control method of high display bandwidth are provided in the present disclosure. The display apparatus and the control method are capable of switching the USB Type-C pin-assignment D mode that uses two USB SuperSpeed channels to transmit image signal to the USB Type-C pin-assignment C mode that uses four USB SuperSpeed channels to transmit image signal, thereby improving the display performance of the display apparatus. In addition, in the USB Type-C pin-assignment C mode, the external USB device may still transfer data to the host via the USB hub and USB High-Speed channels, thereby maintaining the data-transmission function of the display apparatus.

In addition, in yet another embodiment, a display apparatus and a control method of high data bandwidth are provided in the present disclosure. The display apparatus and the control method are capable of deactivating the multi-function mode and DisplayPort alternate mode of the display apparatus, so that the host may communicate with the display apparatus and the external downstream USB device using four USB SuperSpeed channels of the USB Type-C interface when the display apparatus is manually set to the high data-bandwidth mode or in a non-USB-C display mode, thereby achieving high data bandwidth.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A display apparatus, comprising:
   a display panel; and
   a display controller, electrically connected to a universal serial bus (USB) Type-C interface of a host via a USB Type-C interface of the display apparatus,
   wherein in response to the USB Type-C interface of the display apparatus being in a USB Type-C default pin-assignment mode, the display controller receives an image signal from the host via two of four USB SuperSpeed channels of the USB Type-C interface of the display apparatus, and displays the image signal on the display panel,
   wherein in response to a display mode of the display apparatus satisfying a specific condition and the display apparatus being in the USB Type-C default pin-assignment mode, the display controller controls the USB Type-C interface to enter a USB Type-C first pin-assignment mode from the USB Type-C default pin-assignment mode, and the host utilizes the four USB SuperSpeed channels of the USB Type-C interface of the display apparatus to transmit the image signal to the display controller.

2. The display apparatus as claimed in claim 1, wherein the specific condition indicates that the display apparatus uses 4K image resolution, activates a high-dynamic-range (HDR) function, or activates a DisplayPort multi-stream transport (MST) function.

3. The display apparatus as claimed in claim 1, wherein:
in response to the display apparatus being in the USB Type-C default pin-assignment mode, a multi-function mode of the display apparatus is activated and the USB Type-C default pin-assignment mode is a pin-assignment D mode of a DisplayPort alternate mode,
in response to the display apparatus being in the USB Type-C first pin-assignment mode, the multi-function mode of the display apparatus is deactivated and the USB Type-C first pin-assignment mode is a pin-assignment C mode of the DisplayPort alternate mode.

4. The display apparatus as claimed in claim 3, further comprising:
a power delivery (PD) controller, comprising a first register and a second register, wherein the first register is configured to record an activation status of the multi-function mode, and the second register is configured to record a USB Type-C pin-assignment mode of the display apparatus; and
a channel controller, configured to receive a CC-channel signal from the USB Type-C interface of the display apparatus, and to determine whether to forward the CC-channel signal to the PD controller according to a channel-control signal from the display controller.

5. The display apparatus as claimed in claim 4, wherein:
in response to the display mode of the display apparatus satisfying the specific condition, the display controller transmits a PD control signal to the PD controller to modify the first register to record a first value corresponding to a deactivation status of the multi-function mode, and to modify the second register to record a second value corresponding to the USB Type-C first pin-assignment mode,
in response to the first register and the second register being respectively modified to the first value and the second value, the display controller sets the channel-enable signal to a low-logic state, so that connection between the host and the PD controller is disconnected, and then sets the channel-enable signal to a high-logic state, so that the host renegotiates with the PD controller to set the USB Type-C interface of the host and the USB Type-C interface of the display apparatus to enter the USB Type-C first pin-assignment mode, and the host transmits the image signal to the display controller via the four USB SuperSpeed channels of the USB Type-C interface of the display apparatus.

6. The display apparatus as claimed in claim 5, further comprising:
a USB hub, electrically connected to the USB Type-C interface of the display apparatus, and electrically connected to an external USB device via a USB output port; and
a multiplexer, configured to transmit the image signal received by the four USB SuperSpeed channels or two of the four SuperSpeed channels of the USB Type-C interface of the display apparatus to the display controller according to a switch-control signal from the PD controller.

7. The display apparatus as claimed in claim 6, wherein:
in response to the USB Type-C interface of the display apparatus being in the USB Type-C default pin-assignment mode, the multiplexer, according to the switch-control signal, forwards the image signal received by two of the four USB SuperSpeed channels of the USB Type-C interface of the display apparatus to the display controller, and forwards a data signal received by another two of the four USB SuperSpeed channels of the USB Type-C interface of the display apparatus to the USB hub,
in response to the USB Type-C interface of the display apparatus being in the USB Type-C first pin-assignment mode, the multiplexer, according to the switch-control signal, forwards the image signal received by the four USB SuperSpeed channels of the USB Type-C interface of the display apparatus to the display controller, and the USB hub performs data transmission with the host via a USB HighSpeed channel of the USB Type-C interface of the display apparatus.

8. A control method of high display bandwidth, for use in a display apparatus, wherein the display apparatus comprises a display panel and a display controller, and the display apparatus is electrically connected to a USB Type-C interface of a host via a USB Type-C interface of the display apparatus, the control method comprising:
in response to the USB Type-C interface of the display apparatus being in a USB Type-C default pin-assignment mode, receiving an image signal from the host via two of four USB SuperSpeed channels of the USB Type-C interface of the display apparatus, and displaying the image signal on the display panel; and
in response to a display mode of the display apparatus satisfying a specific condition and the display apparatus being in the USB Type-C default pin-assignment mode, controlling the USB Type-C interface to enter a USB Type-C first pin-assignment mode from the USB Type-C default pin-assignment mode, so that the host utilizes the four USB SuperSpeed channels of the USB Type-C interface of the display apparatus to transmit the image signal to the display controller.

9. The control method an as claimed in claim 8, wherein the specific condition indicates that the display apparatus uses 4K image resolution, activates a high-dynamic-range (HDR) function, or activates a DisplayPort multi-stream transport (MST) function.

10. The control method an as claimed in claim 8, further comprising:
in response to the display apparatus being in the USB Type-C default pin-assignment mode, a multi-function mode of the display apparatus is activated and the USB Type-C default pin-assignment mode is a pin-assignment D mode of a DisplayPort alternate mode; and
in response to the display apparatus being in the USB Type-C first pin-assignment mode, the multi-function mode of the display apparatus is deactivated and the USB Type-C first pin-assignment mode is a pin-assignment C mode of the DisplayPort alternate mode.

11. The control method an as claimed in claim 10, wherein the display apparatus further comprises a power delivery (PD) controller and a channel controller, and the control method further comprises:
utilizing a first register and a second register of the PD controller to record an activation status of the multi-function mode and a USB Type-C pin-assignment mode of the display apparatus; and
utilizing the channel controller to receive a CC-channel signal from the USB Type-C interface of the display apparatus and determine whether to forward the CC-channel signal to the PD controller according to a channel-control signal from the display controller.

12. The control method an as claimed in claim 11, further comprising:
in response to the display mode of the display apparatus satisfying the specific condition, utilizing the display controller to transmit a PD control signal to the PD controller to modify the first register to record a first value corresponding to a deactivation status of the multi-function mode, and modify the second register to record a second value corresponding to the USB Type-C first pin-assignment mode; and in response to the first register and the second register being respectively modified to the first value and the second value, utilizing the display controller to set the channel-enable signal to a low-logic state, so that a connection between the host and the PD controller is disconnected, and then set the channel-enable signal to a high-logic state, so that the host renegotiates with the PD controller to set the USB Type-C interface of the host and the USB Type-C interface of the display apparatus to enter the USB Type-C first pin-assignment mode, and the host transmits the image signal to the display controller via the four USB SuperSpeed channels of the USB Type-C interface of the display apparatus.

13. The control method an as claimed in claim 12, wherein the display apparatus further comprises a USB hub and a multiplexer, and the control method further comprises:

electrically connecting the USB hub to the USB Type-C interface of the display apparatus and electrically connecting the USB hub to an external USB device via a USB output port; and utilizing the multiplexer to transmit the image signal received by the four USB SuperSpeed channels or two of the four USB SuperSpeed channels of the USB Type-C interface of the display apparatus to the display controller according to a switch-control signal from the PD controller.

14. The control method as claimed in claim 13, further comprising:

in response to the USB Type-C interface of the display apparatus being in the USB Type-C default pin-assignment mode, utilizing the multiplexer, according to the switch-control signal, to forward the image signal received by two of the four USB SuperSpeed channels of the USB Type-C interface of the display apparatus to the display controller, and forward a data signal received by another two of the four USB SuperSpeed channels of the USB Type-C interface of the display apparatus to the USB hub; and in response to the USB Type-C interface of the display apparatus being in the USB Type-C first pin-assignment mode, utilizing the multiplexer, according to the switch-control signal, to forward the image signal received by the four USB SuperSpeed channels of the USB Type-C interface of the display apparatus to the display controller, wherein the USB hub performs data transmission with the host via a USB HighSpeed channel of the USB Type-C interface of the display apparatus.

15. A display apparatus, comprising:
a display panel; and
a display controller, electrically connected to a universal serial bus (USB) Type-C interface of a host via a USB Type-C interface of the display apparatus,
wherein in response to a specific condition being satisfied, the display controller deactivates a multi-function mode and a DisplayPort alternate mode of the display apparatus, so that the display apparatus receives a data signal from the host via four USB SuperSpeed channels of the USB Type-C interface of the display apparatus.

16. The display apparatus as claimed in claim 15, wherein the specific condition indicates that the display apparatus is set to a high data-bandwidth mode.

17. The display apparatus as claimed in claim 15, wherein the specific condition indicates that the display apparatus is currently is a non-USB-C display mode and receive an image signal from a transmission interface other than the USB Type-C interface of the display apparatus.

18. The display apparatus as claimed in claim 15, further comprising:

a power delivery (PD) controller, comprising a first register and a second register, wherein the first register is configured to record an activation status of the multi-function mode, and the second register is configured to record an operation mode of the DisplayPort alternate mode of the display apparatus; and a channel controller, configured to receive a CC-channel signal from the USB Type-C interface of the display apparatus, and to determine whether to forward the CC-channel signal to the PD controller according to a channel-control signal from the display controller.

19. The display apparatus as claimed in claim 18, wherein:

in response to the display mode of the display apparatus satisfying the specific condition, the display controller transmits a PD control signal to the PD controller to modify the first register to record a first value corresponding to a deactivation status of the multi-function mode, and to modify the second register to record a second value corresponding to a deactivation status of the DisplayPort alternate mode, in response to the first register and the second register being respectively modified to the first value and the second value, the display controller sets the channel-enable signal to a low-logic state to disconnect the host from the PD controller, and then sets the channel-enable signal to a high-logic state, so that the host renegotiates with the PD controller to set the USB Type-C interface of the host and the USB Type-C interface of the display apparatus to operate in the deactivated multi-function mode and deactivated DisplayPort alternate mode, and the host transmits the data signal to the display controller via the four USB SuperSpeed channels of the USB Type-C interface of the display apparatus.

20. The display apparatus as claimed in claim 19, further comprising:

a USB hub, electrically connected to the USB Type-C interface of the display apparatus, and electrically connected to an external USB device via a USB output port; and a multiplexer, configured to transmit the data signal received by the four USB SuperSpeed channels of the USB Type-C interface of the display apparatus to the USB hub according to a switch-control signal from the PD controller.

* * * * *